(12) United States Patent
Banerjee et al.

(10) Patent No.: US 8,749,881 B2
(45) Date of Patent: *Jun. 10, 2014

(54) NARROW BAND OMNIDIRECTIONAL REFLECTORS AND THEIR USE AS STRUCTURAL COLORS

(75) Inventors: Debasish Banerjee, Ann Arbor, MI (US); Masahiko Ishii, Okazaki (JP); Minjuan Zhang, Ann Arbor, MI (US)

(73) Assignees: Toyota Motor Engineering & Manufacturing North America, Inc., Erlanger, KY (US); Toyota Motor Corporation, Toyota Aichi (JP)

( * ) Notice: Subject to any disclaimer, the term of this patent is extended or adjusted under 35 U.S.C. 154(b) by 736 days.

This patent is subject to a terminal disclaimer.

(21) Appl. No.: 12/388,395

(22) Filed: Feb. 18, 2009

(65) Prior Publication Data

US 2009/0161220 A1    Jun. 25, 2009

Related U.S. Application Data

(63) Continuation-in-part of application No. 11/837,529, filed on Aug. 12, 2007, now Pat. No. 7,903,339.

(51) Int. Cl.
   *F21V 9/06* (2006.01)
(52) U.S. Cl.
   USPC ......................................................... 359/359
(58) Field of Classification Search
   USPC .......... 359/359, 577, 580, 581, 584, 586–589
   See application file for complete search history.

(56) References Cited

U.S. PATENT DOCUMENTS

| | | | |
|---|---|---|---|
| 6,215,592 B1 * | 4/2001 | Pelekhaty | 359/618 |
| 6,433,931 B1 | 8/2002 | Fink et al. | |
| 6,873,393 B2 | 3/2005 | Ma | |
| 6,903,873 B1 | 6/2005 | Joannopoulos et al. | |
| 7,903,339 B2 * | 3/2011 | Banerjee et al. | 359/588 |
| 8,323,391 B2 * | 12/2012 | Banerjee et al. | 106/31.01 |
| 2003/0002157 A1 * | 1/2003 | Someno | 359/586 |
| 2005/0264874 A1 | 12/2005 | Lin | |
| 2006/0081858 A1 | 4/2006 | Lin et al. | |
| 2009/0153953 A1 | 6/2009 | Banerjee et al. | |

OTHER PUBLICATIONS

Sajeev John et al., Photonic Band Gap Materials; A Semiconductor for Light; Department of Physics, University of Toronto, p. 1-23.
Kate Kaminska et al., Birefringent Omnidirectional Reflector; Applied Optics; vol. 43, No. 7; Mar. 2004.

(Continued)

*Primary Examiner* — Stephone B Allen
*Assistant Examiner* — Tamara Y Washington
(74) *Attorney, Agent, or Firm* — Gifford, Krass, Sprinkle, Anderson & Citkowski, P.C.

(57) ABSTRACT

Disclosed is a multilayer structure wherein a first layer of a first material having an outer surface and a refracted index between 2 and 4 extends across an outer surface of a second layer having a refractive index between 1 and 3. The multilayer stack has a reflective band of less than 200 nanometers when viewed from angles between 0° and 80° and can be used to reflect a narrow range of electromagnetic radiation in the ultraviolet, visible and infrared spectrum ranges. In some instances, the reflection band of the multilayer structure is less than 100 nanometers. In addition, the multilayer structure can have a quantity defined as a range to mid-range ratio percentage of less than 2%.

17 Claims, 11 Drawing Sheets

(56) References Cited

OTHER PUBLICATIONS

M. Deopura et al., Dielectric Omnidirectional Visible Reflector; Optical Society of America; vol. 26, No. 15; Department of Material Science and Engineering, Massachusetts Institute of Technology; pp. 1197-1199.

Distributed Bragg Reflector; en.wikipedia.org/wiki/Bragg_reflector.

Photonic Crystal; en.wikipedia.org/wiki/Photonic_crystals.

* cited by examiner

*Fig-11C* ness**

NARROW BAND OMNIDIRECTIONAL REFLECTORS AND THEIR USE AS STRUCTURAL COLORS

CROSS-REFERENCE TO RELATED APPLICATION

This application claims priority to and is a continuation-in-part of U.S. patent application Ser. No. 11/837,529 filed on Aug. 12, 2007, having the same title and assignee, which is incorporated herein in its entirety by reference.

FIELD OF THE INVENTION

This invention relates generally to reflectors and methods for making reflectors. More specifically, the invention relates to omnidirectional reflectors and methods for making omnidirectional reflectors.

BACKGROUND OF THE INVENTION

A pigment appears as a particular color because it selectively reflects and absorbs certain wavelengths of light. When white light, i.e. light having a roughly equal mixture of the entire visible spectrum of wavelengths, encounters a pigment, some wavelengths are absorbed by the chemical bonds and substituence of the pigment and other wavelengths are reflected. The reflected wavelengths determine the color of the pigment. This type of coloring mechanism is based on light absorption and the molecular structure generally reflects a broad range of wavelength with a moderate reflectivity (50-60%). In contrast, nature provides magnificent colors and metal-type reflectors in insects, butterflies, birds and fish. Such colors found in nature are not based on pigments, but on the interference of light reflected from either a nanoscopic multilayer structure of alternative high and low refractive index materials or a regular array of nano-sized particles. These types of nanostructure assemblies can reflect up to 100% of the incident light.

Such types of nanostructure assemblies, for example multilayer structures, have not been exploited for providing narrow reflection bands of electromagnetic radiation. Therefore, there is a need for a multilayer structure that provides a narrow reflection band, and with the reflection band being constant when the multilayer structure is viewed from various viewing angles. As will be explained hereinbelow, the present invention provides for a multilayer structure which may be applied to produce an omnidirectional structural color and/or an omnidirectional narrow band reflector in the visible electromagnetic range. Also explained is a method for making the multilayer structure. These and other advantages of the invention will be apparent from the drawings and discussion presented herein.

SUMMARY OF THE INVENTION

Disclosed is a multilayer structure wherein a first layer of a first material having an outer surface and a refractive index between 2 and 2.5 extends across an outer surface of a second layer having a refractive index between 1.8 and 2.2. The multilayer stack has an angular dispersion of a reflection peak of less than 100 nanometers when viewed from angles between 0 degrees and 80 degrees. The multilayer structure can be used to reflect a narrow range of electromagnetic radiation in the ultraviolet, visible and infrared spectrum ranges. In some instances, the angular dispersion of the reflection peak is less than 75 nanometers when viewed from angles between 0 degrees and 45 degrees, while in other instances, the angular dispersion of the reflection peak is less than 50 nanometers when viewed from angles between 0 degrees and 45 degrees. In addition, the multilayer structure can have a quantity defined as a range to mid-range ratio of less than 2 percent.

In an embodiment of the multilayer structure, alternating layers of titanium oxide ($TiO_2$) and hafnium oxide ($HfO_2$) having an index of refraction of 2.3 and 2.0, respectively, provides for a green color that has a low angular dispersion of reflectance peak. The multilayer structure can have more than 5 layers, and in some instances has more than 15 layers. In still other instances, the multilayer structure has more than 25 layers.

DETAILED DESCRIPTION OF THE PREFERRED EMBODIMENTS

The present invention includes a multilayer omnidirectional reflector that retains a specific reflection band of ultraviolet, visible or infrared magnetic radiation from arbitrary angles of incidence. As such, the present invention has utility as an omnidirectional reflector for a narrow wavelength range of electromagnetic radiation. In addition, the present invention includes a method for the making of the omnidirectional reflector.

The omnidirectional reflector of the present invention is a multilayered body having a first layer with a first refractive index and a second layer with a second refractive index. In some instances the difference between the refractive indices of the two layers can range between 0.2 to 1.0, and the multilayer structure has a reflection band of less than 200 nanometers when viewed from angles between 0 and 80°. In other instances the difference between the refractive indices of the two layers can range between 0.2 and 0.6, and the multilayer structure has a reflection band of less than 100 nm when viewed from angles between 0° and 65°.

Figure 1:
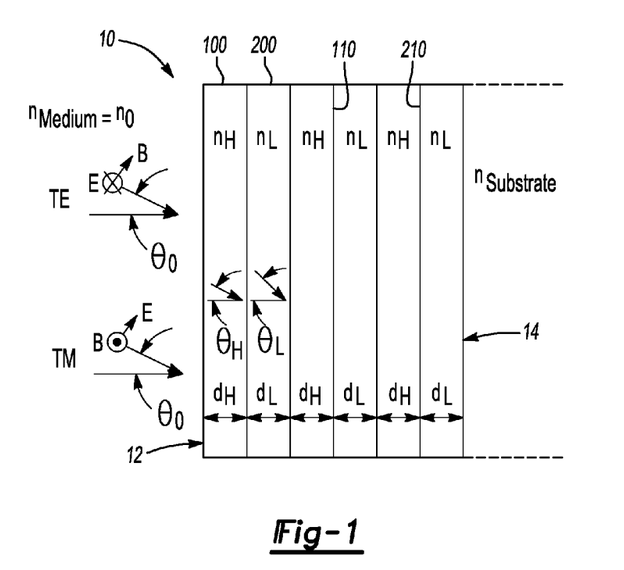
FIG. 1 is a schematic diagram of a multilayer structure of the present invention.

Referring now to FIG. 1, there is shown a multilayer structure 10 having alternating layers of a first material 100 with a high refractive index ($n_H$) and a thickness ($d_H$), and a second material 200 with a low refractive index ($n_L$) and a thickness ($d_L$). The first material 100 includes and outer surface 110 that can extend across an outer surface 210 of the second material 200. In some instances, the multilayer structure 10 has a total number of layers greater than three. In other instances, the multilayer structure 10 has a total number of layers greater than seven.

An electromagnetic wave consisting of perpendicular electric (E) and magnetic (M) vector components is shown incident to the multilayer structure at an incident angle $\theta_0$. The electromagnetic wave can be distinguished into two independent electromagnetic modes: a transverse electric (TE) mode and a transverse magnetic (TM) mode. The refractive index of the medium beyond the multilayer structure 10 at a first end 12 is $n_0$. For example, when the medium is air, $n_0=1$. The refractive of an optional substrate at a second end 14 is $n_{Substrate}$. The optional substrate can be any material compatible with the multilayer structure 10 and can assist in the manufacture, storage, shipping and/or handling of the structure. If an optional substrate is present, it may or may not be removed after the manufacture of the multilayer structure 10.

When electromagnetic radiation impacts a material surface, waves of the radiation can be reflected from or transmitted through the material. Furthermore, when electromagnetic radiation impacts the first end 12 of the multilayer structure 10 at the angle $\theta_0$, the reflected angles the electromagnetic waves make with the surface of the high and low refractive index layers are $\theta_H$ and $\theta_L$, respectively. Using Snell's law:

$$n_0 \sin\theta_0 = n_L \sin\theta_L = n_H \sin\theta_H \tag{1}$$

the angles $\theta_H$ and $\theta_L$ can be determined if the refractive indices $n_H$ and $n_L$ are known.

Regarding omnidirectional reflectivity, a necessary but not sufficient condition for the TE mode and the TM mode of electromagnetic radiation requires the maximum angle of refraction ($\theta_{H,MAX}$) inside the first layer to be less than the Brewster angle ($\theta_B$) of the interface between the first layer and the second layer. If this condition is not satisfied, the TM mode of the electromagnetic waves will not be reflected at the second and all subsequent interfaces and thus will transmit through the structure. Using this consideration:

$$\sin\theta_{H,Max} = \frac{n_0}{n_H} \tag{2}$$

and $$\tan\theta_B = \frac{n_L}{n_H} \tag{3}$$

Thereby requiring:

$$n_0 < \frac{n_H n_L}{\sqrt{n_H^2 + n_L^2}} \tag{4}$$

In addition to the necessary condition represented by Equation 4, if electromagnetic radiation of wavelength λ falls on a multilayer structure with an angle $\theta_0$, and the individual bilayers of the multilayer structure have thicknesses $d_H$ and $d_L$ with respective refractive indices $n_H$ and $n_L$, the characteristic translation matrix ($F_T$) can be expressed as:

$$F_T = \frac{1}{1+\rho_T}\begin{vmatrix} e^{i\delta_L} & \rho_T e^{-i\delta_L} \\ \rho_T e^{i\delta_L} & e^{-i\delta_L} \end{vmatrix} \times \frac{1}{1-\rho_T}\begin{vmatrix} e^{i\delta_H} & \rho_T e^{-i\delta_H} \\ \rho_T e^{i\delta_H} & e^{-i\delta_H} \end{vmatrix} \tag{5}$$

which can also be expressed as:

$$F_T = \frac{1}{1-\rho_T^2}\begin{vmatrix} e^{i(\delta_L+\delta_H)} - \rho_T^2 e^{-i(\delta_H-\delta_L)} & -2i\rho_T e^{-i\delta_H}\sin\delta_L \\ 2i\rho_T e^{i\delta_H}\sin\delta_L & e^{-i(\delta_L+\delta_H)} - \rho_T^2 e^{-i(\delta_H-\delta_L)} \end{vmatrix} \tag{6}$$

and where:

$$\delta_H = \frac{2\pi}{\lambda} n_H d_H \cos\theta_H \tag{7}$$

$$\delta_L = \frac{2\pi}{\lambda} n_L d_L \cos\theta_L \tag{8}$$

$$\cos\theta_H = \sqrt{1 - \frac{n_0^2 \sin^2\theta_0}{n_H^2}} \tag{9}$$

and $$\cos\theta_L = \sqrt{1 - \frac{n_0^2 \sin^2\theta_0}{n_L^2}} \tag{10}$$

In addition, $$\rho_T = \frac{n_{HT} - n_{LT}}{n_{HT} + n_{LT}} \tag{11}$$

where $$n_{HT} = \begin{cases} \dfrac{n_H}{\cos\theta_H} \\ n_H \cos\theta_H \end{cases} \qquad (12)$$

(for *TM* and *TE* polarization respectively)

and $$n_{LT} = \begin{cases} \dfrac{n_L}{\cos\theta_L} \\ n_L \cos\theta_L \end{cases} \qquad (13)$$

(for *TM* and *TE* polarization respectively)

Solving $\rho_T$ explicitly for TE and TM:

$$\rho_{TM} = \dfrac{n_H \cos\theta_L - n_L \cos\theta_H}{n_H \cos\theta_L + n_L \cos\theta_H} \qquad (14)$$

and $$\rho_{TE} = \dfrac{n_H \cos\theta_H - n_L \cos\theta_L}{n_H \cos\theta_H + n_L \cos\theta_L} \qquad (15)$$

A viewing angle dependant band structure can be obtained from a boundary condition for the edge, also known as the bandedge, of the total reflection zone. For the purposes of the present invention, bandedge is defined as the equation for the line that separates the total reflection zone from the transmission zone for the given band structure.

A boundary condition that determines the bandedge frequencies of the high reflectance band can be given by:

$$\text{Trace}|F_T| = -1 \qquad (16)$$

Thus, from equation 3:

$$\dfrac{\cos(\delta_H + \delta_H) - \rho_T^2 \cos(\delta_H - \delta_L)}{1 - \rho_T^2} = -1 \qquad (17)$$

or expressed differently:

$$\cos^2\left(\dfrac{\delta_H + \delta_L}{2}\right) = \rho_T^2 \cos^2\left(\dfrac{\delta_H - \delta_L}{2}\right) \qquad (18)$$

Combining equations 15 and 7, the following bandedge equation is obtained:

$$\cos\left(\dfrac{\pi L_+}{\lambda}\right) = \pm |\rho_T| \cos\left(\dfrac{\pi L_-}{\lambda}\right) \qquad (19)$$

Where:

$$L_+ = n_H d_H \cos\theta_H + n_L d_L \cos\theta_L \qquad (20)$$

and:

$$L_- = n_H d_H \cos\theta_H - n_L d_L \cos\theta_L \qquad (21)$$

The + sign in the bandedge equation shown above represents the bandedge for the long wavelength ($\lambda_{long}$) and the − sign represents the bandedge for the short wavelength ($\lambda_{short}$). Recompiling equations 20 and 21:

$$\cos\left(\dfrac{\pi L_+}{\lambda_{long}}\right) = +|\rho_{TE}| \cos\left(\dfrac{\pi L_-}{\lambda_{long}}\right) \text{ and} \qquad (22)$$

$$\cos\left(\dfrac{\pi L_+}{\lambda_{short}}\right) = -|\rho_{TE}| \cos\left(\dfrac{\pi L_-}{\lambda_{short}}\right)$$

for the TE mode, and:

$$\cos\left(\dfrac{\pi L_+}{\lambda_{long}}\right) = +|\rho_{TM}| \cos\left(\dfrac{\pi L_-}{\lambda_{long}}\right) \text{ and} \qquad (23)$$

$$\cos\left(\dfrac{\pi L_+}{\lambda_{short}}\right) = -|\rho_{TM}| \cos\left(\dfrac{\pi L_-}{\lambda_{short}}\right)$$

for the TM mode.

An approximate solution of the bandedge can be determined by the following expression:

$$L_- = n_H d_H \cos\theta_H - n_L d_L \cos\theta_L \sim 0 \qquad (24)$$

This approximate solution is reasonable when considering a quarter wave design (described in greater detail below) and optical thicknesses of the alternating layers chosen to be equal to each other. In addition, relatively small differences in optical thicknesses of the alternating layers provide a cosine close to unity. Thus, equations 23 and 24 yield approximate bandedge equations:

$$\lambda_{long}(\theta_0) = \dfrac{\pi L_+(\theta_0)}{\cos^{-1}|\rho_{TE}(\theta_0)|} \text{ and} \qquad (25)$$

$$\lambda_{short}(\theta_0) = \dfrac{\pi L_+(\theta_0)}{\cos^{-1}(-|\rho_{TE}(\theta_0)|)}$$

for the TE mode and:

$$\lambda_{long}(\theta_0) = \dfrac{\pi L_+(\theta_0)}{\cos^{-1}|\rho_{TM}(\theta_0)|} \text{ and} \qquad (26)$$

$$\lambda_{short}(\theta_0) = \dfrac{\pi L_+(\theta_0)}{\cos^{-1}(-|\rho_{TM}(\theta_0)|)}$$

for the TM mode.

Values for $L_+$ and $\rho_{TM}$ as a function of incident angle can be obtained from equations 7, 8, 14, 15, 20 and 21, thereby allowing calculations for $\lambda_{long}$ and $\lambda_{short}$ in the TE and TM modes as a function of incident angle.

Figure 2:
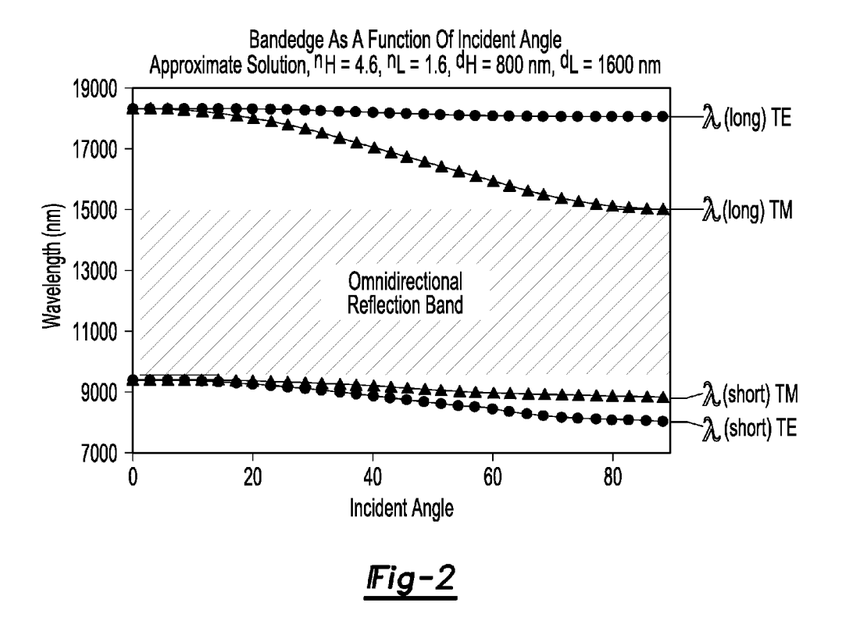
FIG. 2 is a graphical representation of bandedge as a function of incident angle.

Turning to FIG. 2, the TE and TM bandedges as a function of incident angle on a multilayer system with a first material having a high refractive index equal to 4.6 and a thickness of 800 nanometers and a second layer material with a refractive index of 1.6 and a thickness of 1600 nanometers are shown. The omnidirectional band is defined by the wavelength range where electromagnetic radiation coming from any angle will be completely reflected as shown by the highlighted box. For the example shown in FIG. 2, the omnidirectional band is in the infrared region and is approximately between the wavelengths of 9.34 microns and 15 microns. Mathematically, the omnidirectional band shown in FIG. 2 can be written as:

$$\Delta\lambda_{omni} = \lambda_{long}^{TM}(90°) - \lambda_{short}^{TE}(0°) \qquad (27)$$

Figure 3:
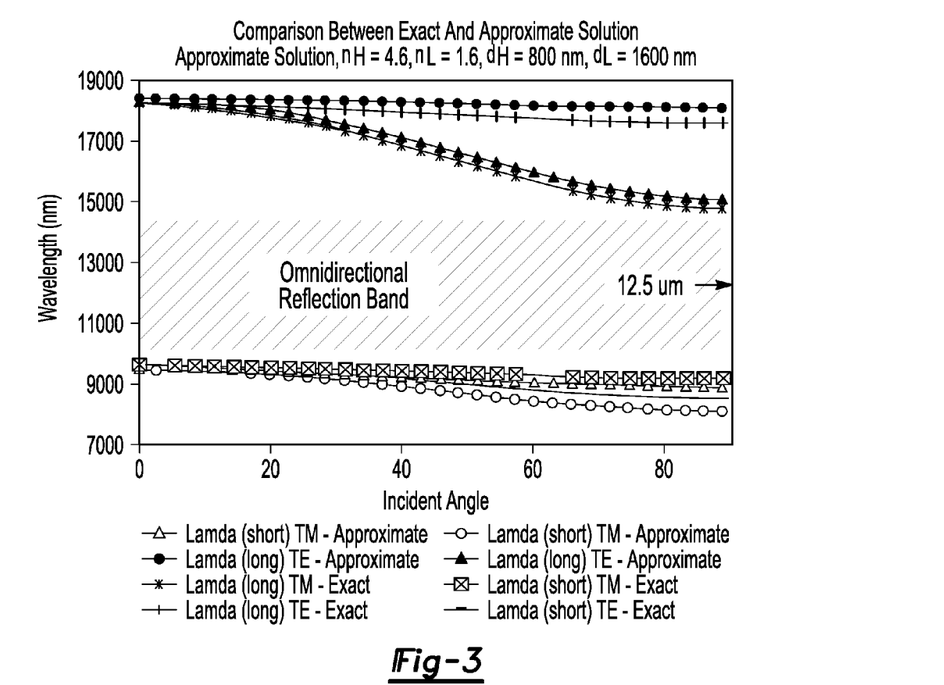
FIG. 3 is a graphical representation comparing an exact solution and an approximate solution for bandedge as a function of incident angle.

An exact solution to the bandedge equations of equation 23 and equation 24 can be represented as:

$$\lambda_{long}(\theta_0) = \frac{\pi L_+(\theta_0)}{\cos^{-1}\left|\rho_{TE}(\theta_0)\cos\left(\frac{\pi L_-}{\lambda_{Long}}\right)\right|} \text{ and} \quad (28)$$

$$\lambda_{Short}(\theta_0) = \frac{\pi L_+(\theta_0)}{\cos^{-1}\left|\rho_{TE}(\theta_0)\cos\left(\frac{\pi L_-}{\lambda_{Short}}\right)\right|}$$

for the TE mode, and:

$$\lambda_{long}(\theta_0) = \frac{\pi L_+(\theta_0)}{\cos^{-1}\left|\rho_{TM}(\theta_0)\cos\left(\frac{\pi L_-}{\lambda_{Long}}\right)\right|} \text{ and} \quad (29)$$

$$\lambda_{Short}(\theta_0) = \frac{\pi L_+(\theta_0)}{\cos^{-1}\left|\rho_{TM}(\theta_0)\cos\left(\frac{\pi L_-}{\lambda_{Short}}\right)\right|}$$

for the TM mode. Using numerical evaluation, a comparison between the exact and approximate solutions for the multilayer system described above is shown in FIG. 3. FIG. 3 thus demonstrates that an approximation method for the determination of the bandedge equations is reasonable and adequate.

The center wavelength of an omnidirectional reflector (i), can be determined from the relation:

$$\lambda_c = 2(n_H d_H \cos\theta_H + n_L d_L \cos\theta_L) \quad (30)$$

The center wavelength can be an important parameter since its value indicates the approximate range of electromagnetic wavelength and/or color spectrum to be reflected. For example, the multilayer system described above for normal incidence provides a center wavelength of 12.5 microns, which is consistent with the plots shown in FIGS. 2 and 3.

Figure 4A:
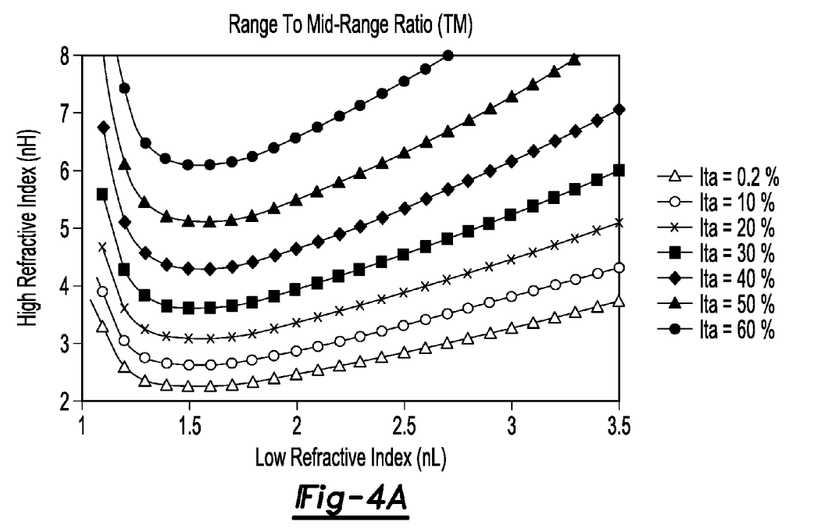
FIG. 4A is a graphical representation of range to mid-range ratios for the transverse magnetic mode of electromagnetic radiation.
Figure 4B:
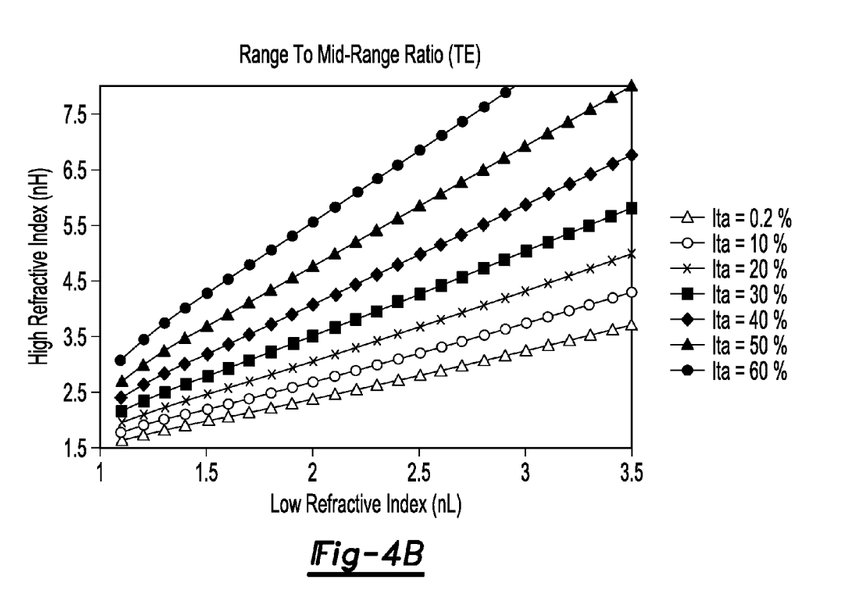
FIG. 4B is a graphical representation of range to mid-range ratios for the transverse electric mode of electromagnetic radiation.

Another important parameter that can provide an indication as to the width of a reflection band is defined as the ratio of range of wavelengths within the omnidirectional reflection band to the mid-range of wavelengths within the omnidirectional reflection band. This "range to mid-range ratio" (q) is mathematically expressed as:

$$\eta_{TE} = 2\frac{\lambda_{long}^{TE}(\theta_0 = 90^\circ) - \lambda_{Short}^{TE}(\theta_0 = 0^\circ)}{\lambda_{long}^{TE}(\theta_0 = 90^\circ) + \lambda_{Short}^{TE}(\theta_0 = 0^\circ)} \quad (31)$$

for the TE mode, and:

$$\eta_{TM} = 2\frac{\lambda_{long}^{TM}(\theta_0 = 90^\circ) - \lambda_{Short}^{TM}(\theta_0 = 0^\circ)}{\lambda_{long}^{TM}(\theta_0 = 90^\circ) + \lambda_{Short}^{TM}(\theta_0 = 0^\circ)} \quad (32)$$

for the TM mode. It is appreciated that the range to mid-range ratio can be expressed as a percentage and for the purposes of the present invention, the term range to mid-range ratio and range to mid-range ratio percentage are used interchangeably. It is further appreciated that a 'range to mid-range ratio' value provided herein having a '%' sign following is a percentage value of the range to mid-range ratio. The range to mid-range ratios for the TM mode and TE mode can be numerically calculated from equations 31 and 32 and plotted as a function of high refractive index and low refractive index, as illustrated in FIGS. 4A and 4B. Furthermore, once the range to mid-range ratio has been determined, corresponding reflectance as a function of wavelength can be plotted.

Figure 5A:
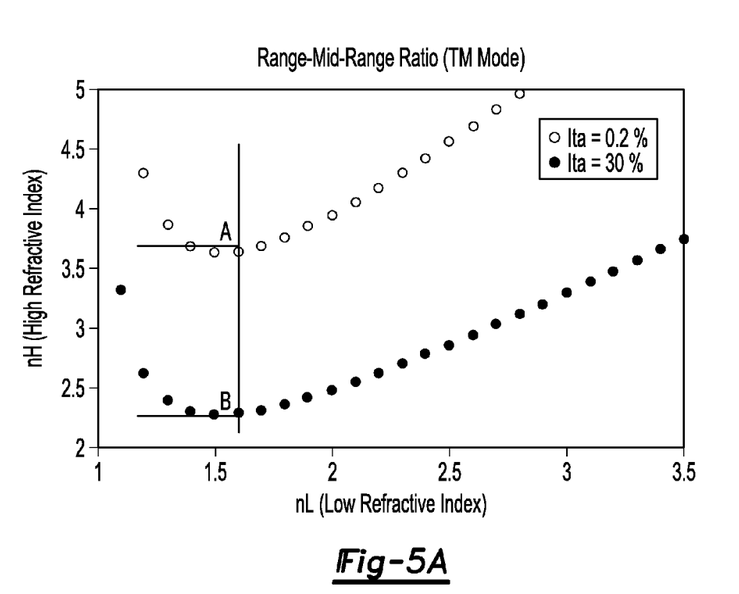
FIG. 5A is a graphical representation of range to mid-range ratios equal to 30% and 0.2%.
Figure 5B:
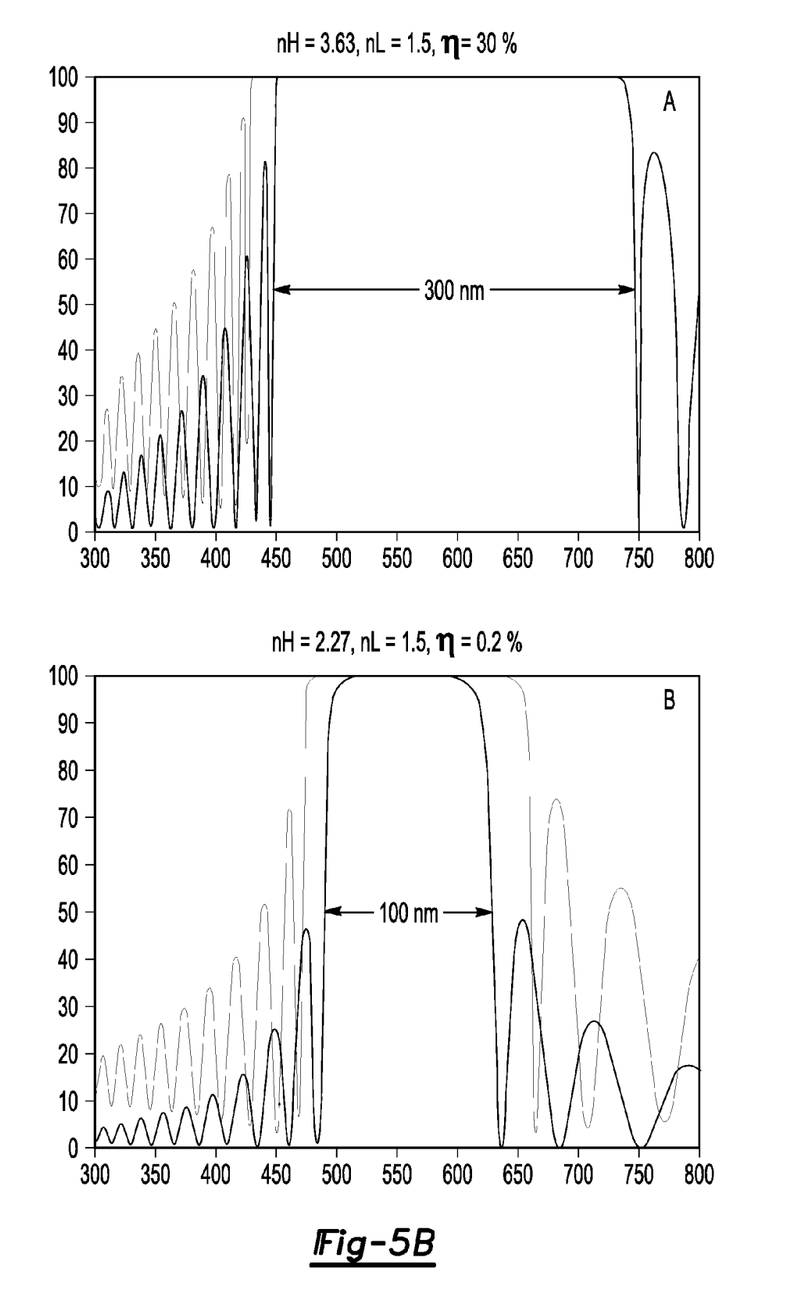
FIG. 5B is a graphical representation of corresponding reflectance spectra for the range to mid-range ratios of 30% and 0.2% shown in FIG. 5A.

An example of the reflectance as a function of the range to mid-range ratio is demonstrated in FIGS. 5A and 5B. FIG. 5A shows two curves for a TM mode range to mid-range ratio—one for $\eta_{TM}$ equal to 0.2% and one for $\eta_{TM}$ equal to 30%. FIG. 5B shows the corresponding reflectance for range to mid-range ratios labeled 'A' and 'B' in FIG. 5A with angles of incidence ranging from 0° to 45°. With a range to mid-range ratio of 30% and the angles of incidence ranging from 0° to 45°, the reflection band illustrated in FIG. 5B is approximately 300 nanometers. In contrast, for a range to mid-range ratio of 0.2% and the same angles of incidence, the reflection band is approximately 100 nanometers.

Regarding the center wavelength of the omnidirectional reflector, equation 30 demonstrates that the center wavelength, and therefore the dispersion of the center wavelength, is a function of the incidence angle. In some instances, the omnidirectional reflectors of the present invention have a small dispersion of the center wavelength as a function of the incidence angle. The narrower the range of the dispersion of the center wavelength, the purer the observed color since a more narrow band of wavelengths are reflected from the reflector to, for example, a human eye.

Figure 6:
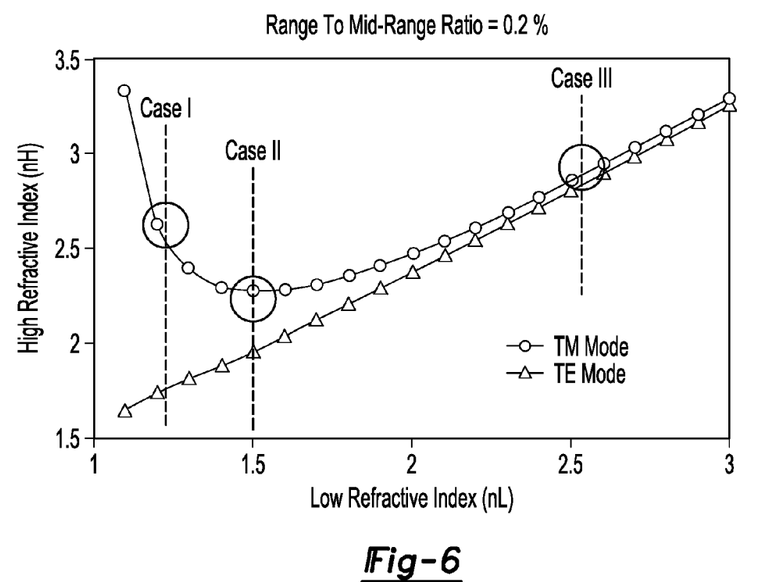
FIG. 6 is a graphical representation showing a comparison of the range to mid-range ratio of 0.2% for the transverse magnetic mode and transverse electric mode of electromagnetic radiation.

A method to control the dispersion of the center wavelength can include comparison of the range to mid-range ratios for the TM mode and the TE mode as a function of high reflection indices and low reflection indices. FIG. 6 illustrates a range to mid-range ratio of 0.2% for the TM mode and the TE mode as a function of high refractive index and low refractive index. As illustrated in FIG. 6, a relatively large difference between the high refractive indices for the TM mode and TE mode is shown by Case I, an intermediate difference by Case II, and a relatively small difference by Case III. Thus for a given range to mid-range ratio, different values for the high refractive index and the low refractive index can be chosen.

Figure 7A:
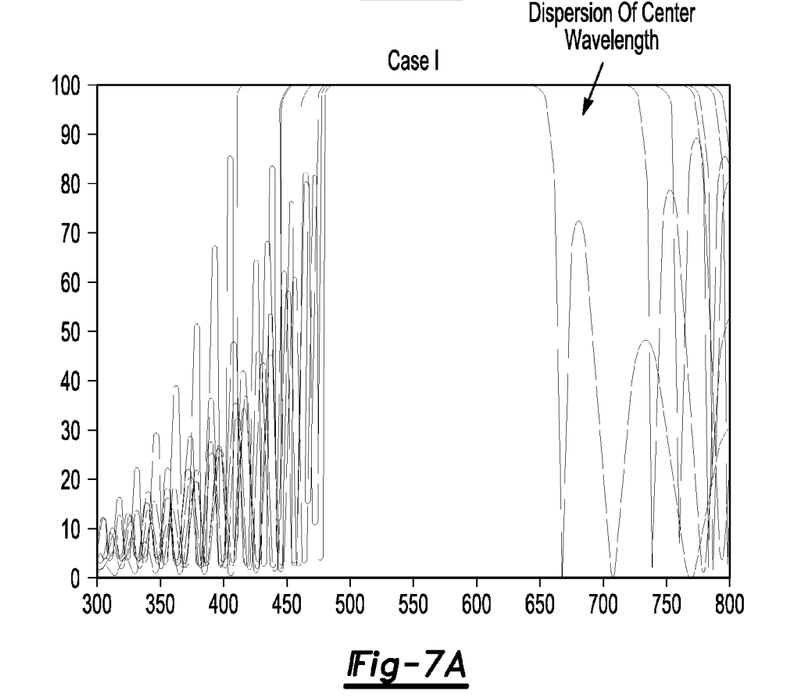
FIG. 7A is a graphical representation of the reflectance as a function of wavelength for Case I shown in FIG. 6.
Figure 7B:
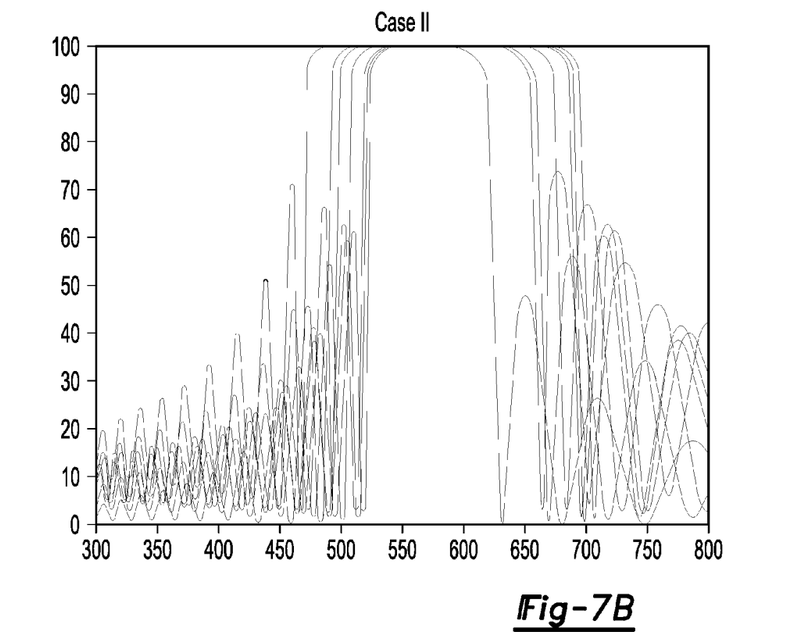
FIG. 7B is a graphical representation of the reflectance as a function of wavelength for Case II shown in FIG. 6.
Figure 7C:
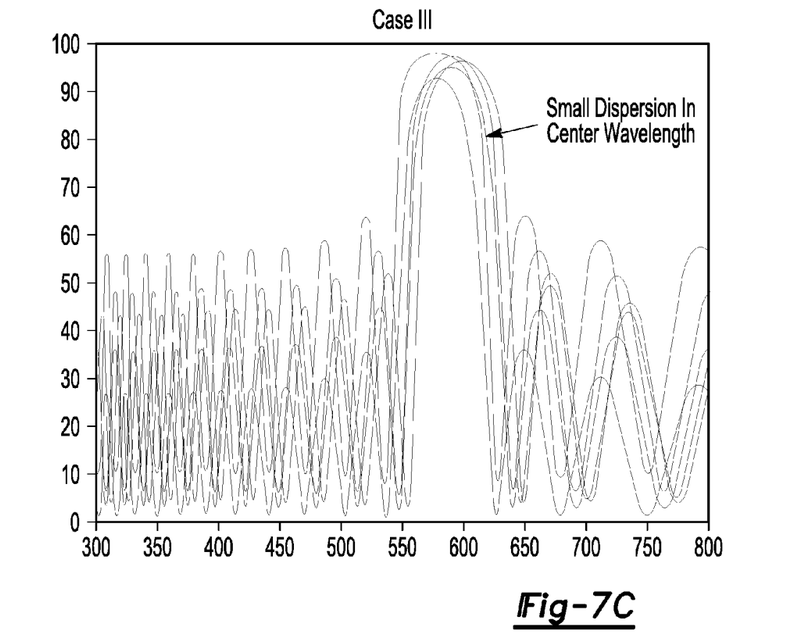
FIG. 7C is a graphical representation of reflectance as a function of wavelength for Case III shown in FIG. 6.
Figure 7D:
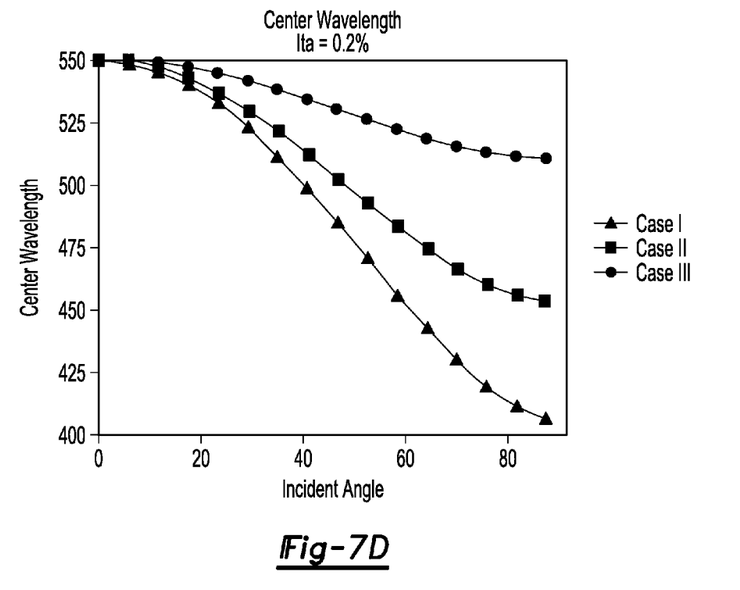
FIG. 7D is a graphical representation of the dispersion of the center wavelength in Case I, II and III.

Turning to FIG. 7A, the reflectance as a function of wavelength for Case I is illustrated wherein the high refractive index equals 2.61, the low refractive index equals 1.2 and the angle of incidence ranges from 0° to 45°. As illustrated by this figure, the center wavelength shifts significantly when electromagnetic radiation incident normal to the multilayer structure is compared to electromagnetic radiation incident 45° to the structure. In contrast, a relatively small difference between the high refractive index and the low refractive index, and equivalent angles of incidence, results in a small dispersion of the center wavelength as shown in FIG. 7C. Thus, for a narrow range of wavelengths to be reflected by a multilayer structure, a relatively small difference between the refractive indices between the first material 100 and the second material 200 is desired. FIG. 7D quantifies the dispersion in center wavelength with varying incident angle for Case I, II and III, and illustrates the reduction in dispersion from approximately 140 nm for Case I to approximately 40 nm for Case III.

In another embodiment of the present invention, a quarter wave technique can be used to determine the refractive indices and thicknesses of alternating layers of material for an omnidirectional reflector. Using this method, the optical thicknesses of the high refractive index material and low refractive index material are set to be equal to each other, and equal to one-fourth of a desired reflective wavelength. Thus, once the refractive indices of the multilayer structure have been selected, the thicknesses of the individual layers are set based on the following equation:

$$\eta_H d_H = \eta_L d_L = \frac{\lambda_o}{4} \quad (33)$$

where $\lambda_0=\lambda_c$ at $\theta_0=0$.

Figure 8:
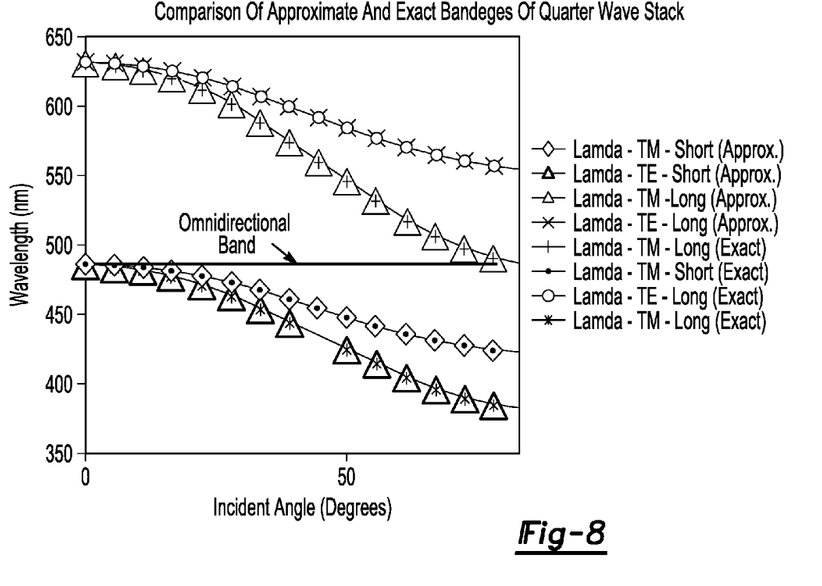
FIG. 8 is a graphical representation of the comparison of approximate and exact solutions for the bandedges of a multilayer structure designed according to the quarter wave technique.

Turning to FIG. 8, a graphical representation of an approximate solution to the bandedges of a quarter wave omnidirectional reflector is shown according to the parameters of Case II mentioned above. This figure also shows the exact solutions whereby similar results are obtained. As illustrated in this figure, a narrow omnidirectional band at 490 nanometers is consistent with the reflectance band shown in FIG. 7B. It is appreciated that to obtain the narrow omnidirectional band that the dispersion of the center wavelength must be minimized. Thus, from equation 30, the dispersion of the center wavelength can be expressed as:

$$\Delta\lambda_c = \lambda_c|_{\theta_0=0^0} - \lambda_c|_{\theta_0=90^0} \quad (34)$$

$$= 2\left(\frac{n_H d_H}{1} + \frac{n_L d_L}{1} - \frac{n_H d_H}{\sqrt{1-\frac{n_0^2}{n_H^2}}} - \frac{n_L d_L}{\sqrt{1-\frac{n_0^2}{n_L^2}}}\right)$$

where:

$$\Delta\lambda_c = \frac{\lambda_0}{4} F_c \quad (35)$$

and $F_c$, the center wavelength dispersion factor can be expressed as:

$$F_c = \left(2 - \frac{1}{\sqrt{1-\frac{n_0^2}{n_H^2}}} - \frac{1}{\sqrt{1-\frac{n_0^2}{n_L^2}}}\right) \quad (36)$$

Figure 9A:
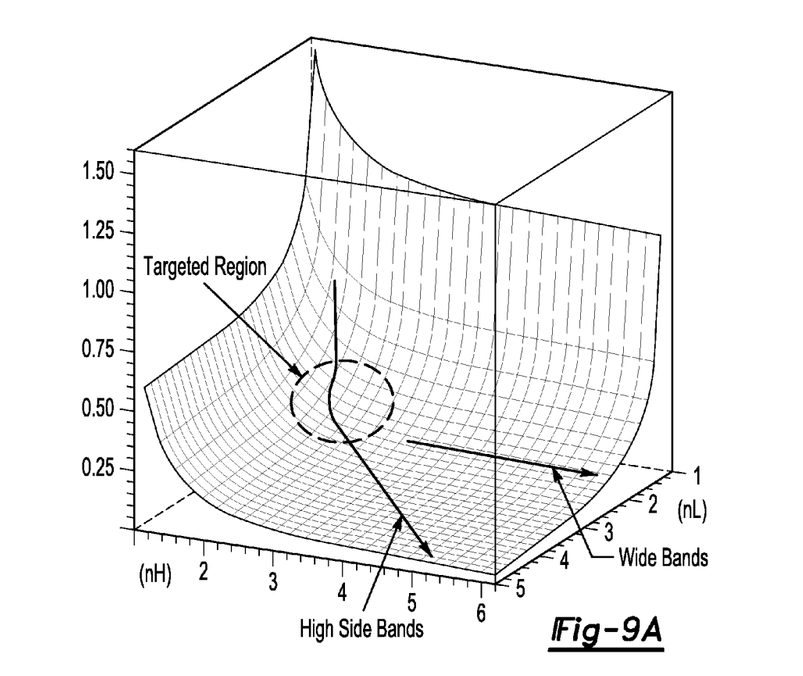
FIG. 9A is a graphical representation of a center wavelength dispersion factor as a function of high refractive indices and low refractive indices.

The center wavelength dispersion factor is shown in FIG. 9A as a function of the high refractive index and the low refractive index. Thus, from equation 36 and FIG. 9A, the dispersion of the center wavelength can be reduced with the proper selection of high and low refractive index material. Also illustrated in FIG. 9A with the "Wide Bands" arrow is the fact that a multilayer structure exhibiting a large difference between the high refractive index and the low refractive index will possess a wide reflection band even though the center wavelength dispersion factor is relatively low. Likewise, when the alternating layers possess a first material with a high refractive index material that approaches the low refractive index of the second material, higher side bands of the reflected electromagnetic radiation occur as illustrated by the "High side bands" arrow. The higher side bands can be reduced using a variety of methods, illustratively including the use of Rugate filters.

Figure 9B:
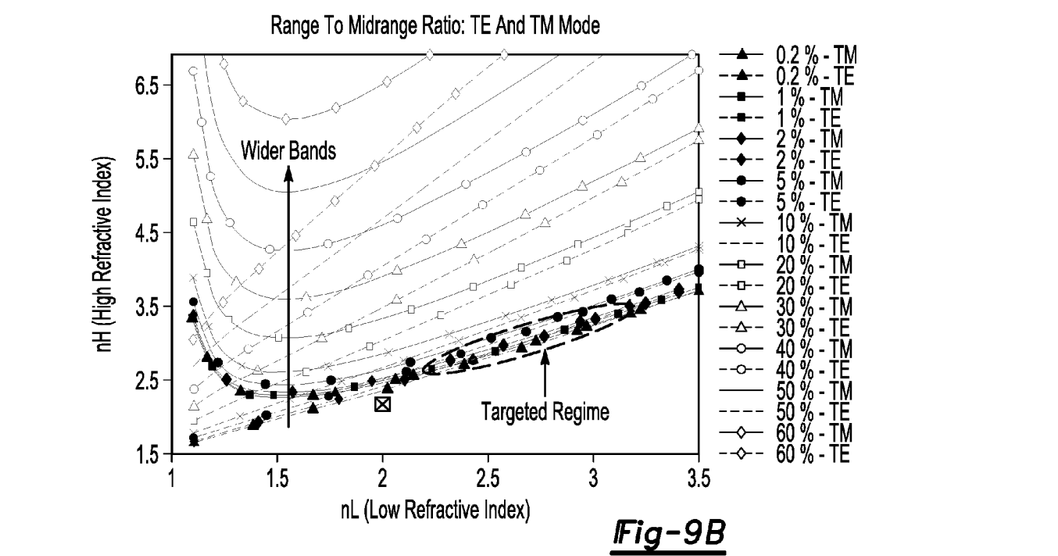
FIG. 9B is a graphical representation of the range to mid-range ratios for transverse electric mode and traverse magnetic mode wherein a desired region of high reflective indices and low reflective indices is highlighted.
Figure 9C:
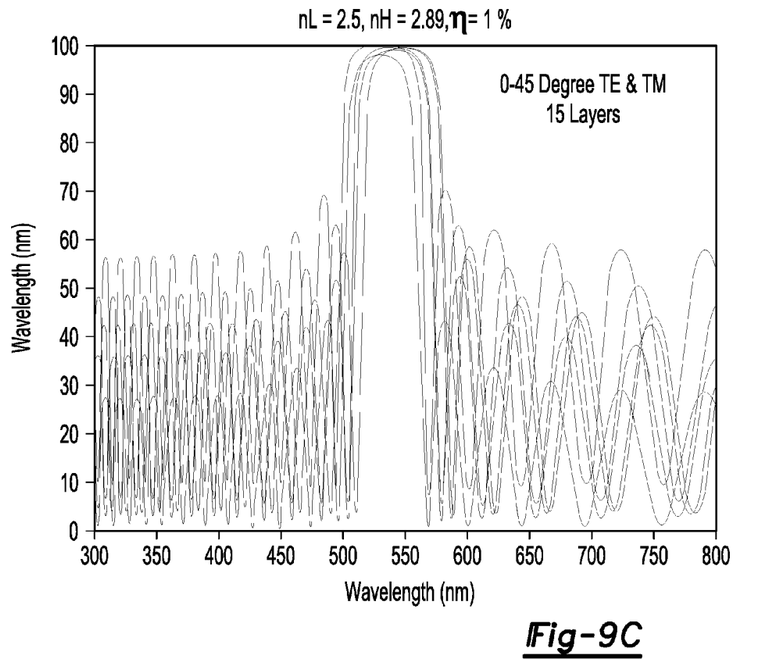
FIG. 9C is a graphical representation of narrow band omnidirectional reflectivity of a case with low refractive index contrast between high and low refractive index material.
Figure 9D:
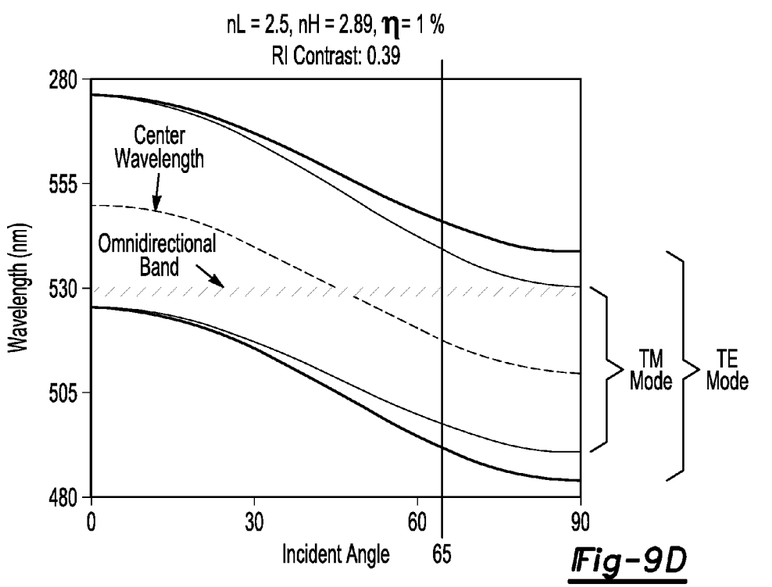
FIG. 9D is a graphical representation of band structure of a narrow band omnidirectional reflective design with low refractive index contrast between high and low refractive index material.

FIG. 9B provides a targeted region for range to mid-range ratios, high refractive indices and low refractive indices. When the difference between range to mid-range ratio of the TE and TM modes is relatively large, a wide or large reflection band of the multilayer structure occurs. In contrast, for relatively small range to mid-range ratios, a relatively narrow reflection band is exhibited with a targeted regime of such values shown in the diagram. In addition, FIGS. 9C and 9D illustrate that when a small refractive index contrast (0.39) is chosen between the high and low refractive index materials, a narrow bandwidth omnidirectional reflector is obtained in the visible region.

Thus, in some instances, omnidirectional reflectors have alternating layers of materials wherein one material has a low refractive index range between 1 and 3 and another material has a high refractive index range between 2 and 4. In addition, the difference between the low refractive index material and the high refractive index material, herein defined as the refractive index contrast, ranges between 0.2 and 1.0, and the range to mid-range ratio percentage varies from a value greater than zero to 10%. In other instances, the materials used for the alternating layers of an omnidirectional reflector include a first material with a low refractive index ranging between 2 and 3, a second material with a high refractive index ranging from 2.47 to 3.38. In yet other instances, the difference between the high refractive index material and the low refractive index material can be between 0.35 and 0.5, and/or the range to mid-range ratio percentage can be a value greater than zero and 5%. In some instances the mid-range ratio percentage can also range between a value greater than zero and 2%. Suitable materials for the production of an omnidirectional reflector of the present invention are chosen such that the above-stated criteria are met.

Table 1 shows possible, but not limited to, high and low refractive index materials, respectively, for an omnidirectional reflector exhibiting a narrow reflective band. Thus, by choosing appropriate materials such that the difference between the refractive indices is between 0.2 to 1.0, and the range to mid-range ratio percentage is between a positive value greater than zero and 10%, an omnidirectional reflector which affords for a structural color that remains constant when viewed from various angles is provided. In some instances the structural color provided by the omnidirectional reflector of the present invention remains constant when view from angles between 0° to 80°. In other instances, the structural color remains constant when viewed from angles between 0° to 65°. In yet other instances, the structural color remains constant when viewed from angles between 0° to 45°.

Again, Table 1 is for illustrative purposes only and in no way limits the scope of the present invention. Any two layers having a difference between the refractive indices between 0.2 to 1.0, and a range to mid-range ratio percentage between a positive value greater than zero and 10% is within the scope of the present invention. In addition, it is within the scope of the present invention that more than two different materials can be used in the multilayer stack and/or that one of the alternating layers can be a defect layer, i.e. a layer of material with defects purposefully therein in order to obtain a desired refractive index.

It is appreciated that the omnidirectional reflector of the present invention can be in the form of particles, discs, flakes, and the like. Furthermore, it is also appreciated that the particles, discs, and/or flakes can be mixed with suitable organic and/or inorganic binders in order to form a coating. The binder and the omnidirectional reflector of the present invention can thus be used to provide a paint and/or coating having a color that does not change when viewed from various viewing angles. In addition, the particles, discs, and/or flakes of the present invention can be applied to a surface using other methods, such as electrostatic charging, e-coating, powder coating, spray deposition and the like, such that a surface provides a color that does not change in appearance when viewed from a variety of viewing angles.

TABLE 1

Refractive Index Materials (visible region)

| Material | Refractive Index |
| --- | --- |
| Germanium (Ge) | 4.0-5.0 |
| Tellurium (Te) | 4.6 |
| Gallium Antimonite (GaSb) | 4.5-5.0 |
| Indium Arsenide (InAs) | 4.0 |
| Silicon (Si) | 3.7 |
| Indium Phosphate (InP) | 3.5 |
| Gallium Arsenate (GaAs) | 3.53 |
| Gallium Phosphate (GaP) | 3.31 |
| Vanadium (V) | 3 |
| Arsenic Selenide ($As_2Se_3$) | 2.8 |
| $CuAlSe_2$ | 2.75 |
| Zinc Selenide (ZnSe) | 2.5-2.6 |
| Titanium Dioxide ($TiO_2$) - solgel | 2.36 |
| Alumina Oxide (Al2O3) | 1.75 |
| Yttrium Oxide (Y2O3) | 1.75 |
| Polystyrene | 1.6 |
| Magnesium Fluoride (MgF2) | 1.37 |
| Lead Fluoride (PbF2) | 1.6 |
| Potassium Fluoride (KF) | 1.5 |
| Polyethylene (PE) | 1.5 |
| Barium Fluoride (BaF2) | 1.5 |
| Silica (SiO2) | 1.5 |
| PMMA | 1.5 |
| Aluminum Arsenate (AlAs) | 1.56 |
| Solgel Silica (SiO2) | 1.47 |
| N,N' bis(1naphthyl) - 4,4'Diamine (NPB) | 1.7 |
| Polyamide-imide (PEI) | 1.6 |
| Chromium (Cr) | 3.0 |
| Tin Sulfide (SnS) | 2.6 |
| Low Porous Si | 2.56 |
| Chalcogenide glass | 2.6 |
| Cerium Oxide ($CeO_2$) | 2.53 |
| Tungsten (W) | 2.5 |
| Gallium Nitride (GaN) | 2.5 |
| Manganese (Mn) | 2.5 |
| Niobium Oxide ($Nb_2O_3$) | 2.4 |
| Zinc Telluride (ZnTe) | 3.0 |
| Chalcogenide glass + Ag | 3.0 |
| Zinc Sulfate (ZnSe) | 2.5-3.0 |
| Titanium Dioxide ($TiO_2$) - vacuum deposited | 2.43 |
| Hafnium Oxide ($HfO_2$) | 2.0 |
| Sodium Aluminum Fluoride (Na3AlF6) | 1.6 |
| Polyether Sulfone (PES) | 1.55 |
| High Porous Si | 1.5 |
| Indium Tin Oxide nanorods (ITO) | 1.46 |
| Lithium Fluoride (LiF4) | 1.45 |
| Calcium Fluoride | 1.43 |
| Strontium Fluoride (SrF2) | 1.43 |
| Lithium Fluoride (LiF) | 1.39 |
| PKFE | 1.6 |
| Sodium Fluoride (NaF) | 1.3 |
| Nano-porous Silica (SiO2) | 1.23 |
| Sputtered Silica (SiO2) | 1.47 |
| Vacuum Deposited Silica (SiO2) | 1.46 |

A flake of the present invention can have an average thickness between 0.5 and 5 microns and an average diameter between 5 and 50 microns. For the purpose of the present invention, the term average thickness is defined as the average value taken from at least three different thickness measurements and the term average diameter is defined as the average value taken from at least three different diameter measurements. It is appreciated that the flake can have an optional substrate attached thereto or be a freestanding flake. The substrate can be made from any material known to those skilled in the art, illustratively including metals, alloys, plastics, ceramics, glasses and combinations thereof, and may or may not be removable after the flake is produced.

It is appreciated that narrow band omnidirectional reflectors of the present invention can also be designed, manufactured and used to reflect ultra violet (UV) light. Thus, narrow band omnidirectional reflectors of the present invention can be used to produce UV-reflecting coatings wherein UV-reflecting narrow band omnidirectional reflectors made are added to: (1) currently available paints, stains and the like: (2) coatings of the present invention containing narrow band omnidirectional reflectors which provide visible color; and/or (3) suitable clear binder(s) to produce a clear coating having UV protection capabilities. It is also appreciated that narrow band omnidirectional reflectors of the present invention can be used in telecommunication and optoelectronic devices.

Methods for producing the omnidirectional reflector of the present invention include the sol gel process, electron gun evaporation of alternating layers, vacuum evaporation of alternating layers, thermal evaporation, CVD processes, electrochemical deposition and etching processes, high-vacuum vapor deposition and oxidation processes, sputtering of alternating layers, molecular-beam-epitaxy processes, thermal mechanical processing, chemical processing, poly-electrolyte multilayer deposition by 'layer by layer' processing and/or combinations thereof.

A multilayer structure made from alternating layers of $TiO_2$ and $HfO_2$ was made by depositing over 29 layers. The $TiO_2$ has an index of reflection of 2.3 and $HfO_2$ has an index of refraction of 2.0. The multilayer structure was deposited on high quality glass and had a quarter wave stack with $\lambda_0$=550 nanometers. In addition, half layers of a high refractive index material ($0.5*\lambda_0/4n_H$) was added as a first and last layer in order to provide a low and high pass filter. The refractive index point of (2.0, 2.3) is plotted in FIG. 9B as an 'x' within a square.

Figure 10A:
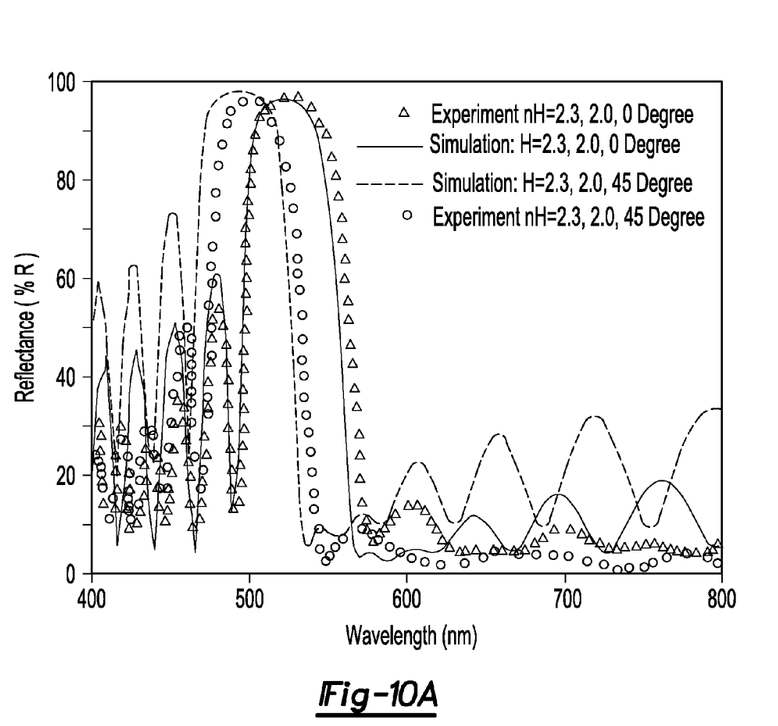
FIG. 10A is a graphical representation of a comparison between calculated and measured reflectance spectra of a 29 layer TiO$_2$/HfO$_2$ structure at angles of 0° and 45 degrees.

Material deposition of the alternating layers of $TiO_2$ and $HfO_2$ was performed using an electron-beam deposition method. Reflectance by the multilayer structure was measured at 0 degrees and 45 degrees using a UV-visible spectrophotometer, the results of which are shown in FIG. 10. A comparison of the measured reflectance to a simulation of the reflectance for each angle is shown in FIG. 10A. As shown in this figure, the angular dispersion of the reflection peak was below 50 nanometers. In addition, the experimental behavior of the reflectance response agrees well with the simulated results. The appearance of the sample at 0 degrees and 45 degrees was a constant green color, in contrast to other structural color samples that were made without omnidirectional reflection bands.

Figure 10B:
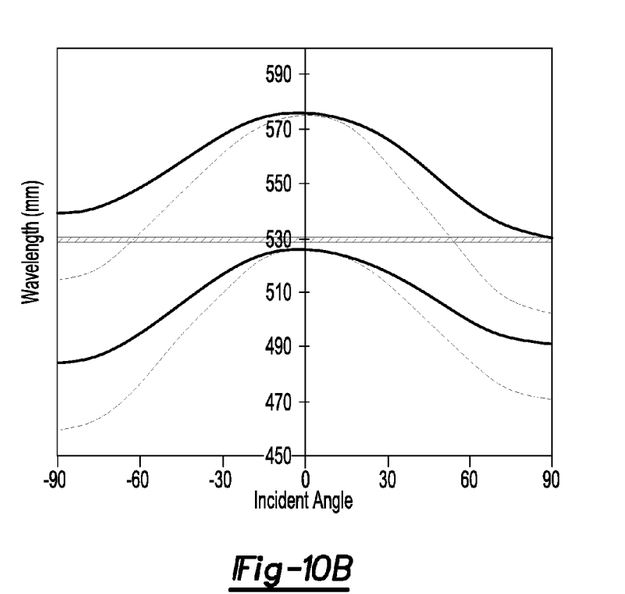
FIG. 10B is a graphical representation of the calculated reflectance band structure of refractive index pairs 2.5, 2.85 and 2.0, 2.3.

The corresponding calculated reflectance band structure is shown in FIG. 10B. The solid line represents a refractive index pair of 2.5, 2.85 while the dashed line represents a refractive index pair of 2.0, 2.3. Also shown in the figure is a narrow omnidirectional reflector band for the refractive index pair 2.5, 2.85, which exists for all incident angles. For paint and/or coating applications, it is appreciated that the random orientation of pigment flakes in a base coat having 0-45° omnidirectionality is sufficient to provide a desired coloring affect.

Figure 11A:
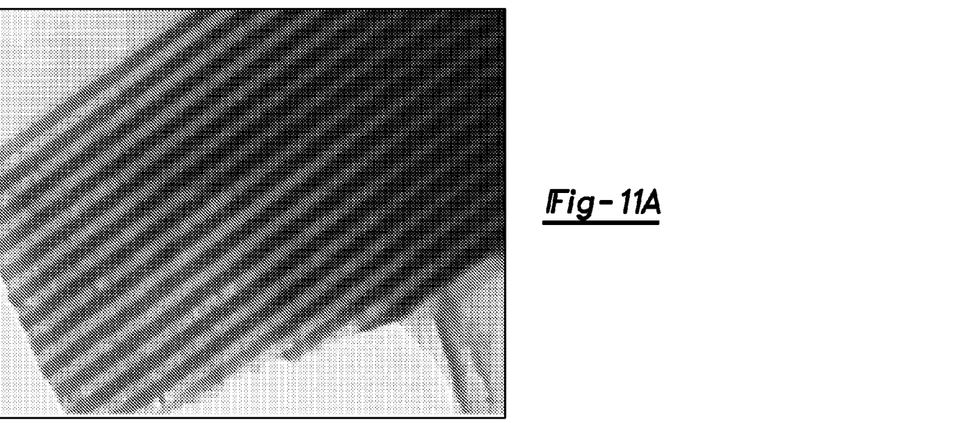
FIG. 11A is a TEM image of a 29 layer TiO$_2$/HfO$_2$ structure.
Figure 11B:
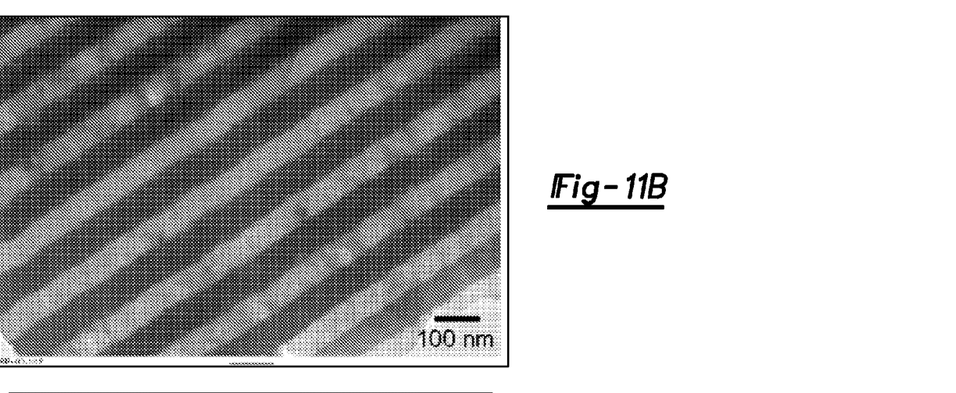
FIG. 11B is a higher magnification of the 29 layer TiO$_2$/HfO$_2$ structure shown in FIG. 10A.
Figure 11C:
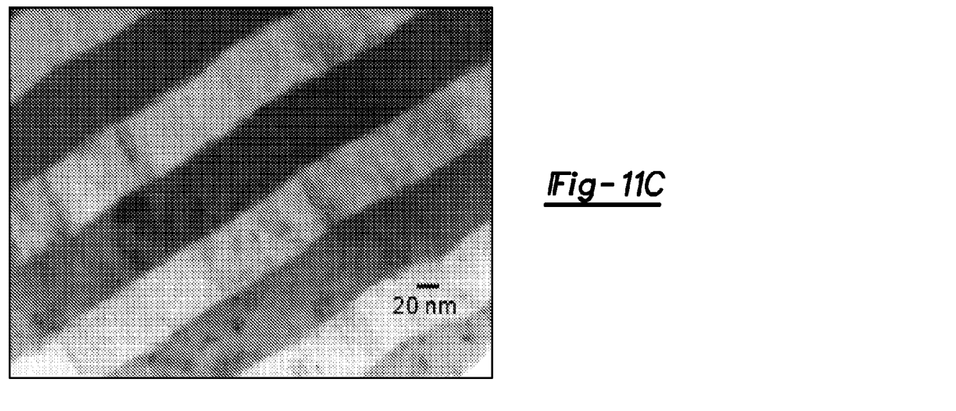
FIG. 11C is a higher magnification of the 29 layer TiO$_2$/HfO$_2$ structure shown in FIG. 11B.

Cross-sectional TEM images of the multilayer structures are shown in FIGS. 11A-11C. The alternating white and black layers correspond to the alternating $TiO_2$ and $HfO_2$ films, respectively.

In this manner, narrow bandwidth omnidirectional reflectors and methods for their production are provided. The foregoing drawings, discussion and description are illustrative of specific embodiments of the present invention, but they are not meant to be limitations upon the practice thereof. Numerous modifications and variations of the invention will be readily apparent to those of skill in the art in view of the teachings presented herein. It is the following claims, including all equivalents which define the scope of the invention.

We claim:

1. A multilayer stack, said stack comprising:
   a first layer of a first material having an outer surface, a first predefined thickness $d_H$ and a refractive index $n_H$ between 1.75 and 3.0; and
   a second layer of a second material having an outer surface, a second predefined thickness $d_L$ and a refractive index $n_L$ between 1.0 and 3.0, said outer surface of said second layer extending across said outer surface of said first layer, said first layer in direct contact with and extending across said second layer;
   said first predefined thickness $d_H$ and said second predefined thickness $d_L$ predefined such that said multilayer stack has a reflection peak of less than 200 nanometers and a dispersion of a center wavelength $\Delta\lambda_c$ of said reflection peak defined as:

$$\Delta\lambda_c = \lambda_c|_{\theta_0=0^0} - \lambda_c|_{\theta_0=45^0} = 2\left(\frac{n_H d_H}{1} + \frac{n_L d_L}{1} - \frac{n_H d_H}{\sqrt{1 - \frac{n_0^2}{n_H^2}}} - \frac{n_L d_L}{\sqrt{1 - \frac{n_0^2}{n_L^2}}}\right)$$

is less than 200 nm when said multilayer stack is viewed from 0 degrees and 45 degrees and where $\lambda_c$ at $\theta_o=0°$ is a center wavelength of said reflection band when said multilayer stack is viewed from 0°, $\lambda_c$ at $\theta_o=45°$ is a center wavelength of said reflection band when said multilayer stack is viewed from 45° and $n_o$ is a refractive index of a medium beyond said multilayer structure.

2. The multilayer stack of claim 1, wherein said reflection peak is less than 75 nanometers when viewed from angles between 0 degrees and 45 degrees.

3. The multilayer stack of claim 1, wherein said reflection peak is less than 50 nanometers when viewed from angles between 0 degrees and 45 degrees.

4. The multilayer stack of claim 1, wherein said first layer has a refractive index between 2.2 and 2.4 and said second layer has a refractive index between 1.9 and 2.1.

5. The multilayer stack of claim 1, wherein a difference between said refractive index of said first layer and said refractive index of said second layer is between 0.1 and 0.5.

6. The multilayer stack of claim 1, wherein a difference between said refractive index of said first layer and said refractive index of said second layer is between 0.2 and 0.4.

7. The multilayer stack of claim 1, wherein said stack has a range to mid-range ratio percentage between a value greater than zero and 10%.

8. The multilayer stack of claim 1, wherein said stack has a range to mid-range ratio percentage between a value greater than zero and 5%.

9. The multilayer stack of claim 1, wherein said stack has a range to mid-range ratio percentage between a value greater than zero and 2%.

10. The multilayer stack of claim 1, wherein said stack has more than three total layers.

11. The multilayer stack of claim 1, wherein said stack has more than seven total layers.

12. The multilayer stack of claim 1, wherein said stack has more than fifteen total layers.

13. The multilayer stack of claim 1, wherein said stack has more than twenty-five total layers.

14. The multilayer stack of claim 1, wherein said first layer is $TiO_2$ having a reflective index of generally 2.3 and said second layer is $HfO_2$ having a reflective index of generally 2.0.

15. The multilayer stack of claim 1, wherein said stack is in the form of a flake.

16. The multilayer stack of claim 15, wherein said flake is mixed with a binder to make a paint.

17. The multilayer stack of claim 15, wherein said flake is mixed with a binder to make a UV-protective coating.

* * * * *